Dec. 1, 1970    L. H. CORZINE    3,544,417
CELLULAR FOAM CORE ASSEMBLY
Filed April 28, 1969    3 Sheets-Sheet 1
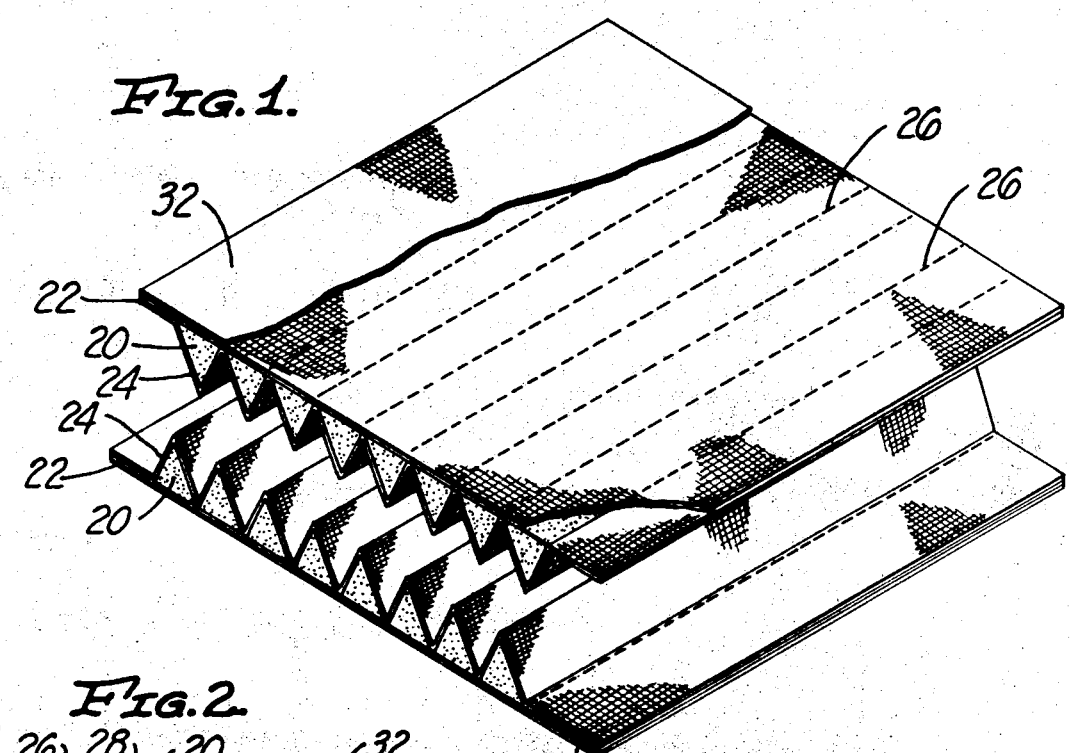
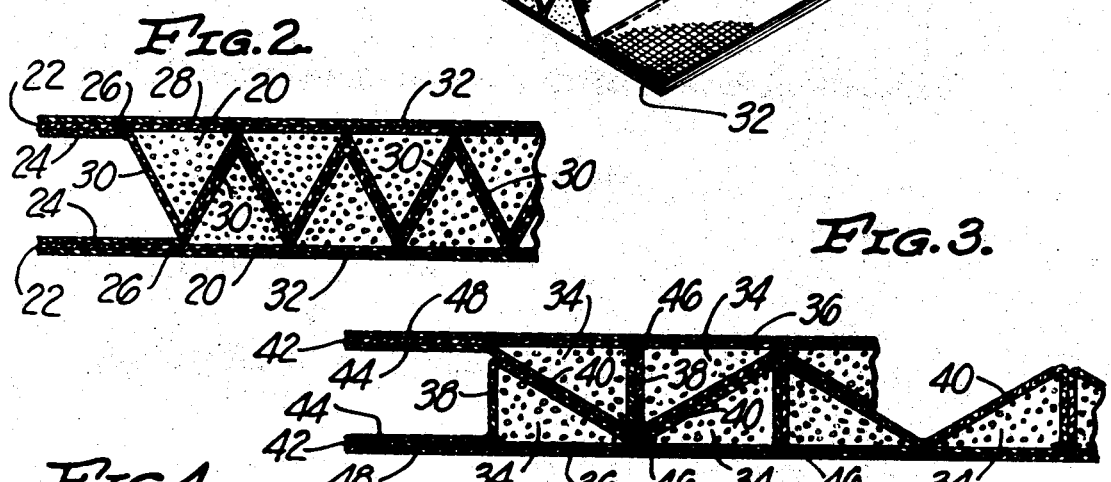
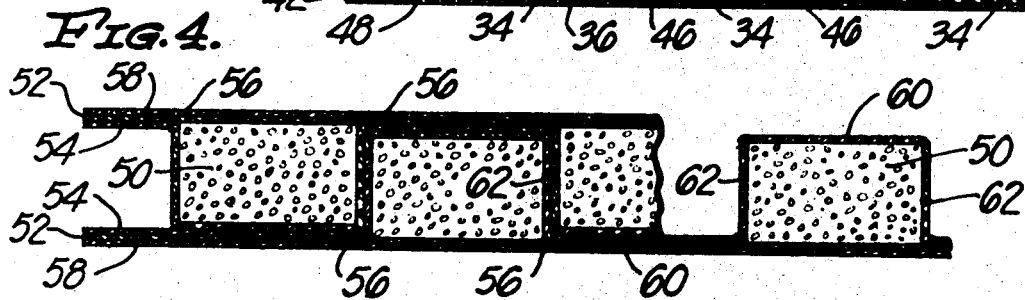
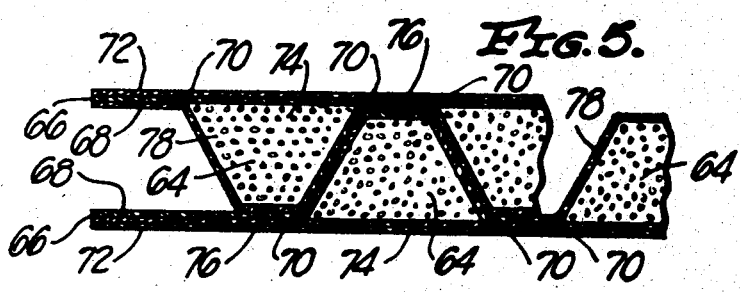
INVENTOR
LUKE H. CORZINE
BY
MAHONEY, HORNBAKER
& SCHICK
ATTORNEYS Dec. 1, 1970  L. H. CORZINE  3,544,417
CELLULAR FOAM CORE ASSEMBLY
Filed April 28, 1969  3 Sheets-Sheet 2
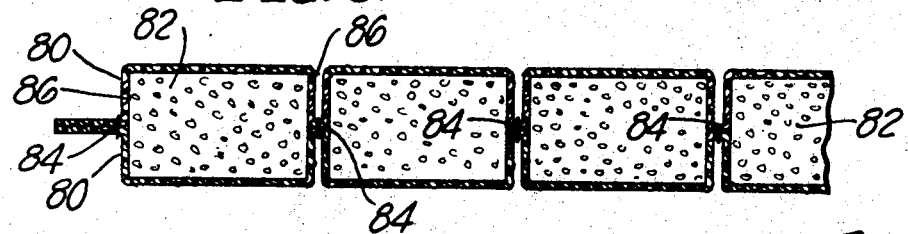
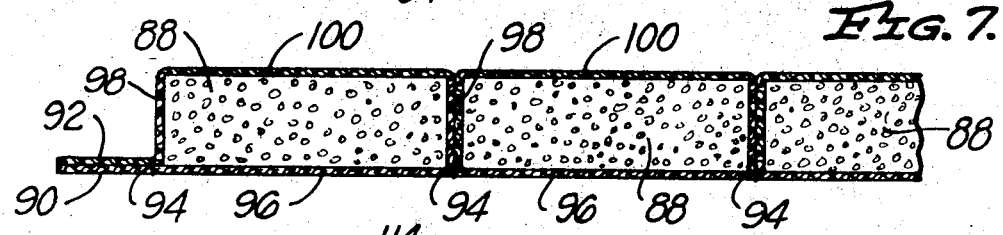
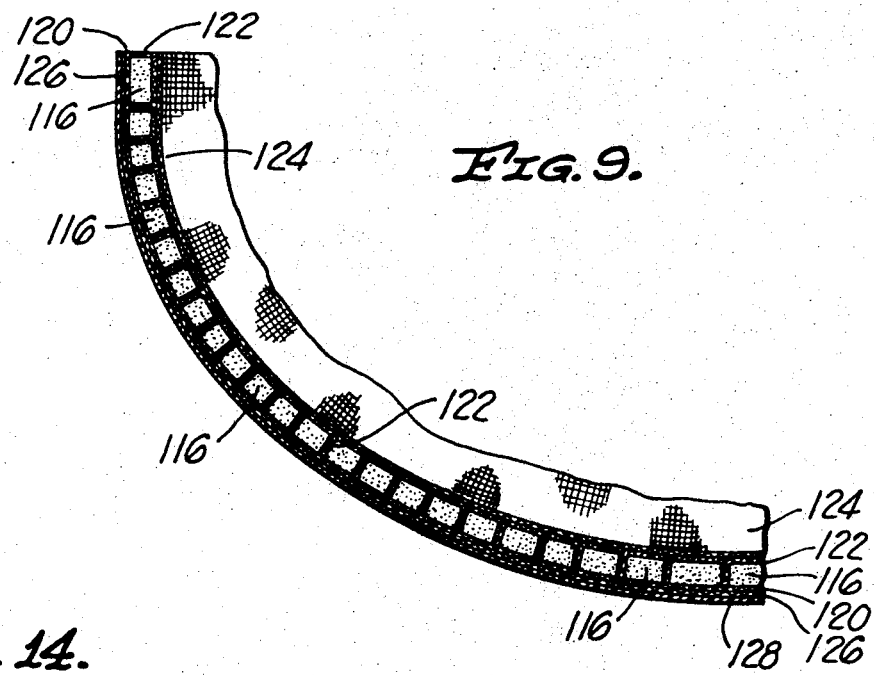
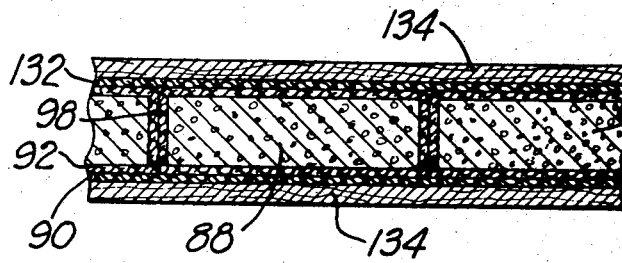
INVENTOR
LUKE H. CORZINE
BY
MAHONEY, HORNAKER
& SCHICK
ATTORNEYS

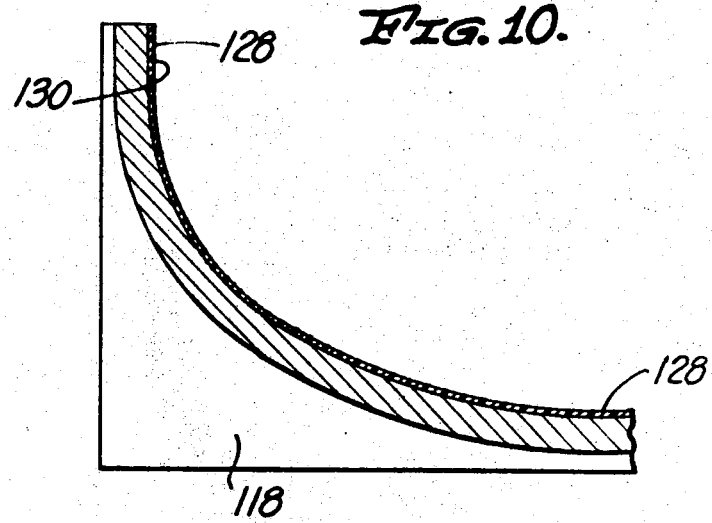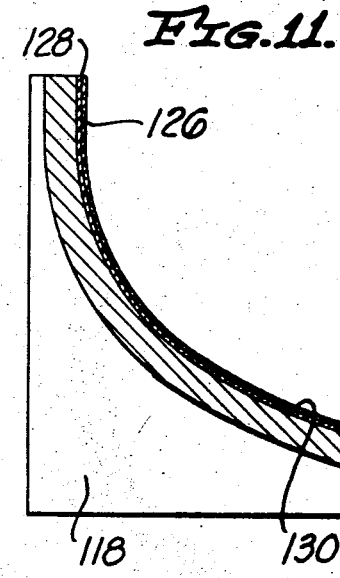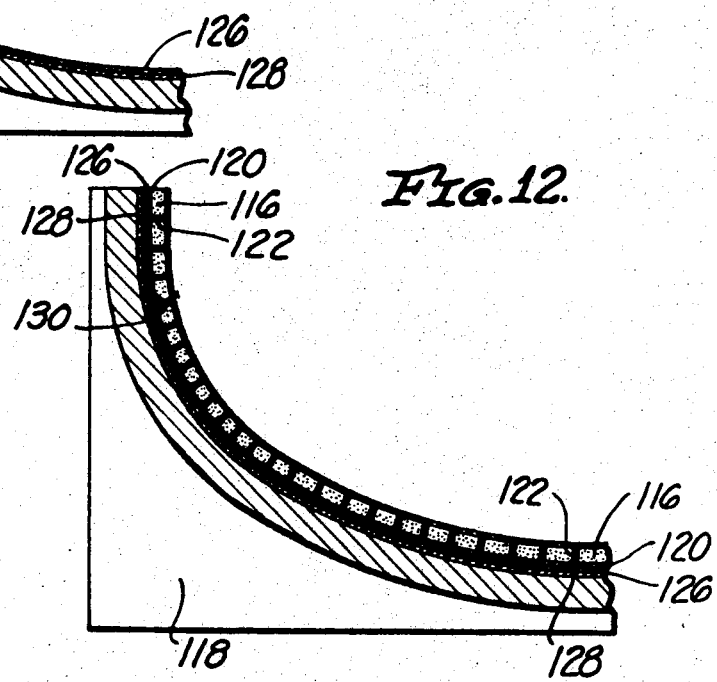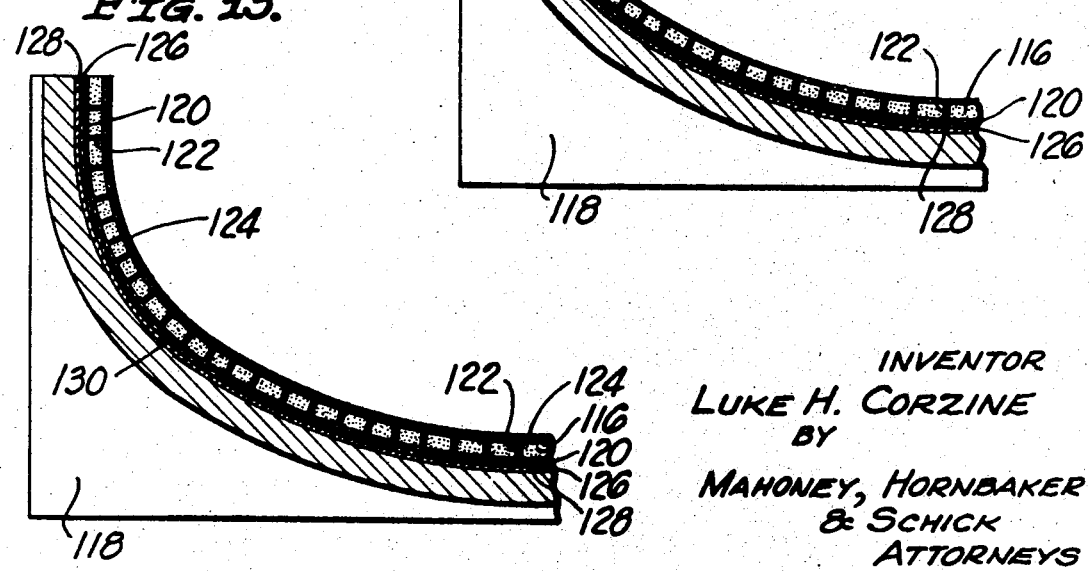

United States Patent Office 3,544,417
Patented Dec. 1, 1970

3,544,417
CELLULAR FOAM CORE ASSEMBLY
Luke H. Corzine, Lakewood, Calif., assignor to Unicor, Inc., Paramount, Calif., a corporation of California
Continuation-in-part of application Ser. No. 383,390, July 17, 1964. This application Apr. 28, 1969, Ser. No. 819,796
Int. Cl. B32b 3/26, 5/18, 7/08
U.S. Cl. 161—50
8 Claims

ABSTRACT OF THE DISCLOSURE

A series of preformed, elongated foam cores are positioned generally longitudinally parallel and transversely aligned and are covered with primary base and covering layers of a relatively flexible fabric, such as fiberglass. In the assembly, the primary base layer extends continuously along common lower base sides of the foam cores, while the primary covering layer extends continuously upwardly over and downwardly transversely between the foam cores, the primary layers being stitched at the transverse extremities of each of the foam cores. Depending on the transverse cross sectional configurations of the foam cores, the stitched primary layer and core assemblies may be used separately or with one inverted and assembled interfitting with another, and may be shaped in various configurations and sandwiched between continuous secondary covering layers of fabric, in all cases all of the fabric layers and stitching being completely covered and impregnated with resin cured to rigidify the overall assembly. Still further, such assemblies may be incorporated with the rigid, thickened face layer of various materials and configuration at one or both sides thereof, for instance, a thickened face layer of cured resin.

CROSS-REFERENCE TO RELATED APPLICATIONS

This application is a continuation-in-part of my copending application Ser. No. 383,390, filed July 17, 1964, now abandoned entitled, "Structural Member and Method of Fabricating."

BACKGROUND OF THE INVENTION

This invention relates to cellular foam core structure assemblies and methods of fabrication of the same, and more particularly, to such assemblies and methods adaptable in a relatively simple manner to an extremely wide variety of uses. For instance, using the same basic procedures and with a proper selection of foam core configuration, the basic cellular foam core structure assembly may be integrated into wood, composition or metal based panel structures having a wide variety of plane or curved shapes, and is equally adaptable to various plastic constructions. Furthermore, the basic cellular foam core structure assembly includes a series of preformed foam cores of a closed cell plastic foam material which are covered in a particular assembled position by specifically shaped primary base and covering layers of a flexible fabric material and the fabric material layers stitched between foam cores for retaining such assembly. In final overall assembly, as selectively integrated with various face coatings and secondary covering fabric layers, the basic assembly has all of the fabric layers and stitching covered and impregnated with a resin which is cured after said covering and impregnation to provide a final basic assembly having relatively high structural strength in the overall assembly despite the simplicity of construction and the wide versatility of use.

Many forms of composite cellular foam and resin rigidified fabric structures have heretofore been provided, all of which have serious inherent limitations and most of which may only be applied to particular customized uses. One of the more prevalent of these prior constructions is the honeycomb core structure or similar, slightly changed adaptations thereof. In the honeycomb core or similar structures, the basic core consists of a mass of adjacent compartments formed by edge positioned fabric strips covered, sometimes impregnated, and rigidified by a cured resin, the thusly formed compartments later being filled by a cellular foam to complete the basic core assembly and then covered by sheets of resin rigidified fabrics and other structural materials for the overall assembly.

In the specific procedures of forming these prior honeycomb and similar basic core structures, the most common method is to first form the fabric strips while the fabric is in a flexible condition into the honeycomb or other adjacent compartment configurations, while at the same time, conforming this then flexible fabric into the desired shape of the final overall assembly. The fabric strips are then resin coated, sometimes resin impregnated, and cured to place the specifically configured fabric strips in a rigidified and form retaining condition. The final basic core structure is then completed by foam filling the rigidly retained compartments with a cellular foam which is normally chemically cured during and immediately following such installation.

Under certain relatively limited conditons, it has been possible to originally form the edge positioned fabric srtips into the honeycomb and similarly shaped compartment form and cured resin rigidify the same while the fabric edges are resting on a plane surface resulting in a compartmentalized shell defining such plane surface. In this case, the resin rigidified shell may be formed into limited curved configurations wherein the compartment openings and the rigidified fabric edges define somewhat curved surfaces as desired in the final overall assembly. The extent to which this originally rigidified flat shell may be shaped into the curved surface defining formation is, of course, determined by the inherent combined flexibility of the fabric and cured resin, but in any event, it is only after this curved surface formation that the final foam filling may take place in order to complete the basic assembly.

Thus, despite the particular procedure followed in the fabrication and formation of these prior honeycomb and similarly shaped basic core structures, the designed use thereof is always further limited and restricted to an overall final structure that permits installation of the foam into the compartments of the core shell during the final overall assembly. This requirement alone greatly restricts the designs to which such prior core structures may be adapted. Also, except as permitted by the extremely small range of flexibility of the cured resin rigidified fabric in the latter fabrication procedure, these prior core structures always require the formation of a specific custom structure usable only in an exactly predetermined final overall structure so that modular basic core structure formation is virtually eliminated.

OBJECTS AND SUMMARY OF THE INVENTION

It is, therefore, an object of this invention to provide cellular foam core structure assemblies and methods of fabrication wherein the basic cellular foam core structure, later integrated into the final overall assembly, is adaptable to both customized fabrication and use where particular conditions dictate, and for widely versatile modular fabrication and use under many other conditions. With the basic cellular foam structure of the present invention, whether in a customized or modular form, there are no limitations placed on the final overall assembly by the requirement of accessibility to install the cellular foam since the cellular foam is originally placed in the basic structure in virtually its final form prior to any attempt to integrate the basic structure into the final overall assembly. Furthermore, there are not limitations as to fabric flexibility in a resin rigidified form, nor any further limitations on fabric weave or original formation, the fabric always remaining in its original flexible form until integration into and the final fabrication of the overall assembly, despite the fact that the basic core structure is of a self integrated form at the time of inclusion into the final overall assembly.

It is a further object of this invention to provide cellular foam core structure assemblies and methods of fabrication having all of the foregoing advantageous attributes, yet the basic core structure is of an extremely simple and easily fabricated form, and is integrated into the final overall assembly with maximum ease and convenience. In general terms, the basic core structure consists of a series of preformed, elongated, cellular foam cores positioned generally parallel in longitudinal extension and generally transversely aligned, said cores being of defined transverse cross sections depending on the intended final structure use, whether of customized form or versatile modular form. A primary base layer of fabric underlies the thusly positioned foam cores and a primary covering layer of fabric extends continuously upwardly over each of the cores to and from the primary base layer, the primary base and covering layers being stitched together at the transverse extremities of each of the cores completing a self-contained assembly wherein the fabric is still in its originally woven flexible form.

At this stage, the basic core structure is ready for integration into the overall assembly and with the fabric still in its original flexible form, the basic core structure may be freely shaped to conform to the desired final overall assembly with only a modified limitation in such shaping by virtue of the preformed foam cores. In this respect, however, the transverse cross sectional shapes of the preformed foam cores, which may be uniform throughout or different at various locations, will to a great extent determine the overall flexibility and the type of final assembly shaping to which the basic core structure may be subjected transversely of the foam cores, and the inherent cellular foam composition of the foam cores will permit a limited amount of flexing longitudinally thereof without destructive fracture and while still maintaining structural integrity. The basic core structure may be flexibly shaped and formed into the final overall assembly as a single unit, or with particular foam core cross sectional shapes and positioning, with a similar basic core structure in a sandwich assembly as a unit, in either case the flexible fabric of the basic core structure being coated and impregnated with a wet resin which is later rigidified by curing to rigidify and resin bond the final overall assembly. In addition, the final overall assembly may include resin rigidified secondary covering layers of fabric and thickened face coats or layers of various materials, all integrated with the basic core structure or structures preferably through cured resin bonding.

It is evident, therefore, that the cellular foam core structure assembly and method of fabrication of the present invention involves a basic concept completely the reverse of the prior composite foam and resin rigidified fabric constructions hereinbefore discussed, such as the honeycomb and similarly shaped basic core structures. In the prior structures, the originally flexible fabric is formed into final shape, cured resin rigidified and then made use of to support the later installed cellular foam, such required procedure creating serious limitations in use of such structures and requiring each to be of customized form. According to the principles of the present invention, however, the cellular foam is originally preformed into determined cross section cores of configurations which will not greatly inhibit but rather actually complement the flexibility of the basic core structures, and these preformed foam cores are used to support the flexible fabric during the integration of the basic core structure into the final overall assembly with the same only being required to be cured resin rigidified in the final stages of integration into the overall assembly so as to permit adaptation to a wide variety of final shapes.

BRIEF DESCRIPTION OF THE DRAWINGS

FIG. 1 is a perspective view, with parts broken away, illustrating two, substantially identical, basic cellular foam core structures, each in subassembly with a secondary covering fabric layer, ready for further assembly into a sandwich construction, all according to certain of the principles of the present invention;

FIG. 2 is an enlarged, fragmentary, vertical sectional view taken transversely of the foam cores and illustrating the foam core structure subassemblies of FIG. 1 in their final sandwich construction including cured resin rigidifying and resin bonding;

FIGS. 3, 4 and 5 are views similar to FIG. 2 but illustrating different forms of foam core structure subassemblies in various sandwich constructions;

FIGS. 6, 7 and 8 are views similar to FIG. 2 but illustrating various forms of basic foam core structures adapted for separate use and prior to any cured resin rigidifying or integration into any subassemblies or final overall assemblies;

FIG. 9 is a fragmentary, vertical sectional view of a final overall assembly incorporating a basic foam core structure or structures having appropriately mixed transverse cross sectionally configured foam cores therein adapting the same for a particular final curvature;

FIGS. 10, 11, 12 and 13 are fragmentary, vertical sectional views illustrating the fabrication steps in the mold lay-up of the final overall assembly of FIG. 9; and FIG. 14 is a fragmentary, vertical sectional view of a final overall assembly incorporating the basic foam core structure of FIG. 7.

DESCRIPTION OF THE BEST EMBODIMENTS CONTEMPLATED

As hereinbefore pointed out, the basic cellular foam core structure of the present invention is of relatively simple structure, yet has extremely wide versatility and is adapted for integration into a great variety of overall final assemblies. It is the intent in the drawings of the present application, and in the following description and discussion, to illustrate and specifically describe the basic cellular foam core structure elements, the fabrication of various basic cellular foam core structures having presently conceived uses, and certain final overall assemblies with the procedural steps for fabricating the same integrating various of the basic cellular foam core structures therein, all constituting parts of the present invention. It is not intended, however, by such illustrations, descriptions and discussions to limit the broader principles of the present invention to these particular embodiments, and it is envisioned that many future uses will be conceived, all within the scope of the present invention.

Referring to FIGS. 1 and 2 of the drawings, an embodiment of basic cellular foam core structure is shown adapted for integration into a sandwich assembly and having certain uses in singular form. The sandwich construction is illustrated and makes use of two of the basic cellular foam core structures, one inverted and interengaged downwardly fully with the other. As is broadly true of all of the basic cellular foam core structures of the present invention, the basic structure herein involved includes a series of preformed, elongated, cellular foam cores generally indicated at 20, a primary base layer of fabric 22, a primary covering layer of fabric 24 and a series of specifically located lines of stitching 26.

Each of the cellular foam cores 20 is preformed prior to even assembly into the basic cellular foam core structure from a closed cell plastic foam material such as polyurethane and similar plastic foam materials so that each of the foam cores is of a shape self-sustaining construction at the time of assembly into the basic core structure. In the formation of the basic core structure, a series of the foam cores 20 are positioned substantially parallel in their longitudinal extension, substantially transversely aligned and in this case, transversely adjacent. Furthermore, each of the foam cores 20 is of the same isosceles triangular shape in transverse cross section so as to have in transverse cross section substantially flat sides consisting of a lower base side 28 and generally oppositely transversely facing sides 30 joined at the core upper extremity.

Continuing with the assembly of the basic core structure, the primary base layer of fabric 22 is positioned extending continuously longitudinally and transversely along and between all of the foam core lower base sides 28 while being maintained subsatntially free of upward projection between the foam cores 20. The primary base layer of fabric 22, as is true of all other fabric layers used in the basic core structure and in most cases throughout cellular foam core structure assemblies, may be a single or multiple ply layer of virtually any weave and of virtually any usual flexible fabric material, such as animal, vegetable and synthetic fibers with fiberglass fibers being preferred for their strength and nondeteriorating qualities in a large number of instances, the choice of weave and fabric material being dependent on the desired characteristics of the finished product. Also, in the basic core structure, and until ready for integration into an overall or final cellular foam core structure subassembly or assembly, the fabric making up the primary base layer 22 remains in its flexible state.

The primary covering layer of fabric 24 of similar flexible fabric is positioned extending continuously longitudinally and transversely over and between the foam core oppositely transversely facing sides 30 so as to cover all of the foam cores 20 upwardly over the upper extremities and contact the primary base layer 22 transversely between the foam cores. The primary covering layer 24 again remains in its flexible state and the basic core structure is completed by stitching transversely between each of the foam cores 20 to secure the primary base and covering layers 22 and 24 together forming the lines of stitching 26, the stitching thread being any of the usual materials and preferably the same as that making up the fabric of the primary base and covering layers. Thus, in the completed basic core structure, the flexible primary base and covering layers 22 and 24 abut all of the flat sides 28 and 30 of all of the foam cores 20 so that the foam cores support these layers at this stage and will continue to do so during integration into the final subassemblies and assemblies, but at the same time, these stitched flexible fabric layers provide complete transverse flexibility of the structure within the limitations of the foam core transverse cross sections and reasonable longitudinal flexibility within the limitations of the foam core internal closed cell constructions.

Although the basic core structure as fabricated with the isosceles triangular configurations of the foam cores 20 has a variety of uses in both singular and multiple form depending on the particular final cellular foam core structure assembly into which it is integrated and the purpose of such final assembly, in the illustration of FIGS. 1 and 2, the basic core structures are integrated into a sandwich assembly wherein one is inverted and interengaged downwardly fully with another. In forming such assembly, the basic core structures have the primary base and covering layers 22 and 24 thereof thoroughly coated and impregnated with a curable wet resin which may be of usual forms such as polyester, epoxy and phenolic resins, and which may be catalyzed to produce rigidifying cures at room temperatures or elevated temperatures, again dependent on the particular characteristics desired, the particular uses and the particular final assemblies. Furthermore, in the particular final assembly of FIGS. 1 and 2, a secondary covering layer of fabric 32 is positioned in flexible state over and continuously covering the primary base layer 22 of each of the basic core structures and is covered and impregnated with the curable wet resin, it being noted that the secondary covering layers likewise do not project upwardly transversely between the foam cores 20, but rather remain only as covering layers.

Thereafter, the basic core structures with their assembled secondary covering layers 32 are brought into final sandwich interengaged assembly in the still flexible and wet state in the manner shown in FIG. 2. This final sandwich assembly is then retained in the final desired shape while the resin curing and rigidifying is carried out, the resin rigidifying causing rigidifying of the entire assembly and the resin bonding of abutting fabric layers in and between the basic core structures, including the stitching 26 and the fabric layers at these areas of the basic core structure. If the resin is catalyzed to produce curing at room temperature, the sandwich assembly is merely retained in the final desired shape for a curing period of time, and if the resin is catalyzed to produce curing at elevated temperatures, the sandwich assembly is raised to such elevated temperatures and retained for the curing time, thereby producing a finally rigidified overall assembly.

As shown in FIG. 2, the sandwich assembly has been shaped for final curing and rigidifying so as to produce a final flat panel, and with the identically sized and shaped foam cores 20, this will produce the maximum contact and resin bond between the parts of the primary covering layers 24 abutting transversely between the foam cores at the foam core facing sides 30 resulting in a virtually solid integrated final overall assembly. While in the fully interengaged sandwich assembly of FIG. 2 and with the basic core structures still in the resin wet stage, it is possible to form limited curved shapes in either or both of the transverse and longitudinal directions within the limits of the inherent flexibility of the closed cell compositions of the foam cores 20, but without actually fracturing or otherwise damaging the cellular structure of the foam cores. More sharp curved shaping, however, and particularly in the assembly transverse direction would require less interengagement between the individual basic core structures although this would still, in finally cured resin rigidified state, produce a relatively strong final assembly as long as some abutment is maintained between the parts of the primary covering layer at the foam core facing sides 30.

In other words, the versatility of even this sandwich form of assembly invarious curved forming is relatively great and a wide choice is presented depending on the ultimate strength, shaping and structural integrity required. Also, this final sandwich assembly, as well as other assemblies and individual basic core structures may be combined still further with various materials, either in the wet stage prior to resin curing and rigidifying or after such curing and rigidifying. Certain of these more complex assemblies using other basic core structures will be hereinafter described more in detail, but it should be kept in mind that the just described sandwich assembly is equally adaptable.

A different final sandwich assembly using two basic core structures is shown in FIG. 3 wherein each of the basic core structures is again identical, but of slightly different configuration. As shown in FIG. 3, a series of elongated foam cores 34 are again positioned parallel in longitudinal extension and generally transversely aligned, the foam cores again being triangular in transverse cross section, but cross sectionally defining right triangles positioned in transversely adjacent sets. Each of the foam cores 34 has a lower base side 36 and may be generally described as having oppositely transversely facing sides, in this case, an upright side 38 and an angled side 40, all sides again being flat.

Still referring to the individual basic core structures, the sets of foam cores 34 are positioned with the upright sides 38 adjacent so that the angled sides 40 of a given set generally transversely face the angled sides of the adjacent foam core sets. A primary base layer of flexible fabric 42 is positioned extending along the foam core lower base sides 36 continuously longitudinally and transversely of the foam cores and between said cores, with a primary covering layer of flexible fabric 44 extending continuously upwardly over the foam core upright and angled sides 38 and 40 including along the upright sides downwardly between the foam cores 34 of each set. The basic core structures are completed ready for integration into a final sandwich assembly by securement of the primary base and covering layers 42 and 44 in their covering positions over the foam cores 34 by lines of stitching 46 at the transverse extremities of each of the foam cores between the primary base and covering layers as shown.

The final assembly of the basic foam cores into the sandwich assembly is virtually the same as previously described, that is, the primary base and covering layers 42 and 44 and the stitching 46 are covered and impregnated with the curable wet resin, secondary covering layers 48 of resin covered and impregnated fabric are applied to the primary base layers, the basic core structures interengagingly assembled and the entire assembly cured to rigidify the resin. The same wide choice of materials may be used in this assembly as in all other assemblies and structures herein described, and the same wide choice of forming is presented within the limits of the various materials used.

Two still different final sandwich assemblies are shown in FIGS. 4 and 5 formed in generally the same manner and from the same materials as those of FIGS. 1 through 3, but involving a slightly different concept of foam core positioning and sandwich interengagement to provide certain specific final qualities. The difference in basic concept of the final sandwich assemblies of FIGS. 4 and 5 is that not only are the foam cores thereof in the individual basic core structures formed with four or an additional flat side, the individual foam cores of each of the basic core structures are transversely spaced uniformly apart. Thus, where the final sandwich assemblies are desired to be in the flat panel form, as shown, in the final, resin cured, rigidified state, increased overall fabric surface contact is obtained between the basic core structures for increased cured resin bonding so as to increase at least shearing strength within the final asembly parallel to the final flat surfaces thereof.

Generally, as before, the sandwich assembly of FIG. 4 has the individual basic core structures each formed with foam cores 50, a flexible fabric primary base layer 52, a flexible fabric primary covering layer 54 and lines of stitching 56, the basic core structures ultimately receiving the flexible fabric secondary covering layers 58 at the time of assembly. The foam cores 50 are, however, rectangular in transverse cross section and spaced transversely apart so that the lines of stitching 56 at the transverse extremities of the foam cores result in two lines of stitching between each set of foam cores spaced transversely apart and the primary base and covering layers 52 and 54 extending abutting transversely between the foam cores, one to the next. In the final sandwich assembly, therefore, the parts of the primary covering layers 54 at upper flat sides 60 give increased surface abutment between the basic core structures for increased shear strength parallel to the flat sides of the final sandwich assembly, and slightly less surface contact at upright, transversely opposed sides 62 of the foam cores.

The basic core structures of the sandwich assembly of FIG. 5 also include foam cores 64, flexible fabric primary base layers 66, flexible fabric primary covering layers 68 and lines of stitching 70, with the later added flexible fabric secondary covering layers 72. Furthermore, the foam cores 64 are in the transversely spaced positions with the double stitching, but the foam cores are of isosceles trapezoidal transverse cross sections with major base sides 74 at the primary base layer 66 and minor or shortened base sides 76 spaced away from the primary base layer. Thus, in the final sandwich assembly of FIG. 5, there is reduced surface abutment between the parts of the primary covering layers 68 of the basic core structures at the foam core shortened base sides 76 slightly reducing the shear strength thereof parallel to the sandwich assembly flat sides, while increased surface contact or abutment between the foam cores at foam core transversely opposed sides 78, again illustrating the wide versatility and wide choice of strength features that may be incorporated into the cellular foam core structures and assemblies of the present invention.

In FIGS. 6, 7 and 8 are shown examples of different basic core structures according to the present invention which are normally used singularly, as opposed to the foregoing sandwich construction. Each of these basic core structures has particular versatility and those of FIGS. 7 and 8 providing the most advantages for reasons to be herein pointed out.

The basic core structure of FIG. 6 is of quite limited use and it is basically different from the other structures herein involved in that it includes two primary covering layers 80 of flexible fabric continuously covering foam cores 82 of rectangular cross section and stitched by lines of stitching 84 midway of foam core transversely facing sides 86. The foam cores 82 may be transversely positioned spaced slightly apart to provide increased flexing formability or may have the parts of the primary covering layers 80 at the transversely facing sides 86 thereof closely abutting for less flexing and more solid resin rigidified final form. It is apparent, howwever, that far less flexibility in formation is provided with this construction due to the midway covering layer stitching.

The more versatile basic core structure of FIG. 7 includes transversely adjacent, rectangular transverse cross section foam cores 88, a flexible fabric primary base layer 90, a flexible fabric primary covering layer 92 and lines of stitching 94 between the primary base and covering layers along the transverse extremities of the foam cores. The primary base layer 90 extends continuously along lower base sides 96 of the foam cores 88 without projecting upwardly transversely therebetween, while the primary covering layer 92 extends continuously upwardly over upright, transversely opposed sides 98 and upper extremity sides 100 of the foam cores from and to the primary base layer and the lines of stitching 94 between said layers. Obviously, the basic core structure of FIG. 7 provides extreme flexibility in the transverse direction before curing since the foam cores 88 may be spread angularly apart in any degree desired prior to integration into a final overall assembly combined with other fabric layers and face surfaces or layers of various types, certain of which will be hereinafter illustrated and described. The final resin rigidifying of the basic core structure is accomplished in the same manner as previously described.

The basic core structure of FIG. 8 is even more versatile for curved formation prior to resin rigidifying than that of FIG. 7 and includes foam cores 102, a flexible fabric primary base layer 104, a flexible fabric primary covering layer 106 and lines of stitching 108. The foam cores 102 are isosceles trapezoidal in transverse cross section positioned with major base sides 110 transversely adjacent and continuously covered by the primary base layer 104 and the primary covering layer 106 extending continuously from and to the primary base layer along transversely opposed or facing sides 112 upwardly over upper extremity minor base sides 114. Thus, in flexible form prior to resin rigidifying and in view of the primary base layer 104 not extending upwardly transversely between the foam cores 102, the basic core structure of FIG. 8 may be transversely flexed by flexing of the fabric layers between the foam cores in the one direction until the parts of the primary covering layer 106 over the foam core transversely facing sides 112 abut, and in the other direction almost unlimited.

Still a further important versatility feature of the cellular foam core structures and assemblies of the present invention are that for custom overall assemblies, and even in certain cases of somewhat modular use, foam cores of different transverse cross sections may be intermixed in a single basic core structure or in an assembly of a series of basic core structures. For instance, in FIG. 9 is illustrated a final overall assembly making use of foam cores 116 of mixed rectangular and isosceles trapezoidal transverse cross sections in order to lay up a boat hull having compound curving while still providing a solid foam and resin rigidified fabric hull construction. The basic core structures used are in the singular form such as those of FIGS. 7 and 8 wherein the foam cores 116 are transversely adjacent and the section of FIG. 9 is transversely through the basic core structure and the foam cores thereof.

The procedural or method steps for forming the boat hull of FIG. 9 are shown in FIGS. 10 through 13 and as would be the usual practice, the lay up is accomplished in a usual form of mold 118. The materials used in this case are preferably preformed foam cores 116 of closed cell polyurethane foam, a flexible fabric primary base layer of fiber glass 120, a flexible fabric primary covering layer of fiber glass 122, a flexible fabric secondary covering layer of fiber glass 124 covering the primary base layer 120, a flexible fabric secondary covering layer of fiber glass 126 covering the parts of the primary covering layer 122 at the foam core upper extremities, and a thickened outer facing or layer 128 of colored resin. The resin used for rigidifying after curing of the various fabric layers and that of the thickened outer facing 128 may be the same and may be of any of the usual forms catalyzed for curing either at room temperature or elevated temperatures, the latter being preferred.

Referring to FIG. 10, the thickened outer facing 128 of wet resin is applied to the molding surface 130 of the mold 118, and although not shown for simplification purposes in FIGS. 10 through 13, it will be noted in FIG. 9 that the molding surface curves rather sharply transversely of the basic core structure and more gently longitudinally of the basic core structure, thereby illustrating compound curving. Next, the flexible fabric secondary covering layer 126 is applied to the inner surface of the thickened outer facing 128 as shown in FIG. 11 and is wet resin covered and impregnated, this subassembly then being resin cured to rigidify the same. This subassembly is then ready for integration with the basic core structure.

The basic core structure is preassembled in flexible form in the manner described relative to those of FIGS. 7 and 8, except that the foam cores 116 are of predetermined mixed transverse rectangular and isosceles triangular cross section. As is evident, the isosceles triangular cross section cores permit the relatively sharp transverse curving while still resulting in a solid core assembly and the rectangular cross section cores are located at the flat or substantially flat portions of the hull.

The primary base and covering layers of the basic core structure, including the previously described lines of stitching thereof (not shown), are wet covered and impregnated with resin, and as shown in FIG. 12, laid up against the previously resin cured subassembly of the secondary covering layer 126 and the thickened outer facing 128. During such laying up, the primary base layer 120 of the basic core structure is retained at the outer side directly against the rigidified secondary covering layer 126 with the upper extremities of the foam cores 116 and the parts of the primary covering layer 122 thereover projecting inwardly and, at this stage, still exposed. The still wet and flexible basic core structure will, therefore, be formed curved transversely to bring the foam core transverse sides and the parts of the primary covering layer 122 thereover into transverse abutment as precalculated by the preforming of the foam core transverse cross sections, while at the same time, the foam cores 116 and their fabric layers will be gently flexed curved longitudinally of the basic core structure within the limits of the foam core closed cell constructions.

Finally, as shown in FIG. 13, the flexible fabric secondary covering layer 124 is applied covering the upper extremities of the foam cores 116 and the parts of the primary covering layer 122 thereover, and as positioned, this secondary covering layer 124 extends merely continuously along the basic core structure as formed and does not project transversely between the adjacent foam cores 116. The secondary covering layer 124 is covered and impregnated with wet resin and the entire second subassembly is resin cured to rigidify the same and resin bond internally, as well as to the secondary covering layer 126 and the thickened outer facing layer 128 which have previously been cured. The resulting assembly may then be removed from the mold 118 and will appear as shown in FIG. 9.

In the foregoing boat hull assembly and in any other assembly where it might be advantageous, usual procedures of vacuum forming may be used as desired. Furthermore, vacuum or pressure may be used to force wet resin into internal portions of the fabric layers and the lines of stitching thereof where advantageous and by usual well known procedures.

Another example of use of a basic core structure for forming an overall final assembly is illustrated in FIG. 14 wherein the basic core structure of FIG. 7 and previously described is integrated into a panel assembly with a secondary covering layer 132 and rigid outer facing layers 134. The basic core structure is formed as before, the primary base and covering layers 104 and 106, as well as the lines of stitching 108, are covered and impregnated with wet resin, the secondary covering layer 132 applied covered and impregnated by the wet resin, the rigid outer facing layers 134, preferably of wood or composition, are applied and the entire assembly cured for rigidifying the resin. The resulting overall assembly will be solid and strong, particularly due to the resin rigidifying of all fabric layers and the resin bonding of all abutting fabric layer parts, while the resin will equally bond the fabric layers to the outer facing layers 134.

Thus, according to the principles of the present invention, cellular foam core structures and assemblies, and methods of fabrication thereof, are provided, all of which involve a new concept of composite foam and resin rigidified fabric constructions virtually the reverse of the concepts used in the prior constructions. Furthermore, the resulting cellular foam core structures and assemblies are extremely versatile, both as to the wide variety of final overall assemblies into which they may be integrated and the degrees of forming which may be incorporated therein. Despite this extreme versatility, the cellular foam core structures and assemblies of the present invention are quite simple and basic in fabrication and may be formed from a wide choice of materials.

I claim:

1. In a cellular foam core structure assembly, the combination of: said assembly including at least one cellular foam core structure; each cellular foam core structure of said assembly including a series of generally parallel, longitudinaly extending and generally transversely aligned foam cores, each core being preformed of a closed cell plastic foam mateiral of a defined transverse cross section with all surfaces in transverse cross section being substantially flat, each core in transverse cross section having at least a lower base side and generally oppositely transversely, facing sides; each cellular foam core structure of said assembly including a primary base layer of fabric extending substantially continuously transversely and longitudinally along and fully contacting and covering said foam core lower base side, said primary base layer abutting said foam core lower base side and extending transversely between said foam cores substantially free of upward projection between said foam cores; each cellular foam core structure of said assembly including a primary covering layer of fabric extending substantially continuously upwardly over and downwardly transversely between said foam cores, said primary covering layer abutting all of said foam core oppositely transversely facing sides free of abutment with said foam core lower base slides and contacting said primary base layer at transverse extremities of each of said foam cores at said primary base layer completing said foam core longitudinal and transverse covering; each cellular foam core structure of said assembly including a generally longitudinally extending line of stitching at each of said foam core transverse extremities securing said primary base and covering layers together at said primary base layer and transversely between each transversely adjacent set of said foam cores of said each cellular foam core structure; said assembly including a lower secondary covering layer of fabric extending generally continuously transversely and longitudinally along fully contacting and covering said primary base layer of said at least one cellular foam core structure of said assembly, said lower secondary covering layer being free of upward projection transversely between any foam cores of said assembly; said assembly including an upper secondary covering layer of fabric extending generally continuously transversely and longitudinally along said assembly overlying and upwardly covering those parts of said primary covering layer of said at least one cellular foam core structure of said assembly at upper extremities of said foam cores thereof, said upper secondary covering layer being free of downward projection transversely between any foam cores of said assembly; said assembly including cellular foam core structure cores of said assembly being closely transversely adjacent one to the next transversely adjacent core with the primary covering layer of each core abutting the primary covering layer of that core's next transversely adjacent core; and cured resin covering, impregnating and rigidifying all of said base and covering layers of said assembly throughout said layers including said stitching, said cured resin bonding between said layers at said stitching and at all other areas of abutment between said layers rigidifying and bonding said assembly.

2. A foam core structure assembly as defined in claim 1 in which said foam cores of said at least one cellular foam core structure are positioned with said transverse extremities at said primary base layer adjacent, said foam cores being one of isosceles or right angle triangular in transverse cross section; and in which said at least one cellular foam core structure is a first cellular foam core structure and a second substantially identical cellular foam core structure is positioned inverted and downwardly over and interfitting with said first cellular foam core structure of said assembly, said foam cores of said first and second cellular foam core structures being constructed and arranged in said assembly in transverse cross section with said generally oppositely transversely facing sides totally interfitting and generally transversely aligned and with said primary covering layers over said oppositely transversely facing sides abutting and resin bonded, said upper secondary covering layer of said assembly overlying and upwardly covering the primary base layer of said second cellular foam core structure.

3. A foam core structure assembly as defined in claim 1 in which said foam cores of said at least one cellular foam core structure of said assembly are rectangular in transverse cross section with said upper secondary covering layer of said assembly overlying and upwardly covering upper extremities thereof.

4. A foam core structure assembly as defined in claim 1 in which said foam cores of said at least one cellular foam core structure of said assembly are rectangular in transverse cross section and are positioned with transverse extremities thereof closely adjacent and with said upper secondary covering layer of said assembly overlying and upwardly covering upper extremities thereof.

5. A foam cure structure assembly as defined in claim 1 in which said foam cores of said at least one cellular foam core structure are rectangular in transverse cross section and spaced transversely apart with one of said lines of stitching positioned along each transverse extremity of each of said foam cores and with said primary covering layer abutting and being resin bonded to said primary base layer totally transversely between said foam cores; and in which said at least one cellular foam core structure is a first cellular foam core structure and a second substantially identical cellular foam core structure is positioned inverted and assembled downwardly interfittingly engaged with said first cellular foam core structure, said foam cores of said first and second cellular foam core structures being constructed and arranged in said assembly with said foam cores alternately transversely interfitting and transversely aligned, said transversely facing sides of all of said foam cores in said interengaged assembly having said primary covering layers abutting and cured resin bonded, said primary covering layers of said structures along flat upper extremities of said foam cores of each of said structures abutting said primary covering layer of the other of said structures transversely between said other structure foam cores and being resin bonded thereto, said upper secondary covering layer of said assembly overlying and upwardly covering the primary base layer of said second cellular foam core structure.

6. A foam core structure assembly as defined in claim 1 in which said foam cores of said at least one cellular foam core structure are isosceles trapezoids in transverse cross section with shorter upper base sides spaced away from said primary base layer, said foam cores of said at least one cellular foam core structure being positioned transversely adjacent in said structure with said transversely facing sides of adjacent foam cores having said primary covering layer thereover transversely abutting and resin bonded; and in which said secondary covering layer of said assembly extends substantially continuously transversely and longitudinally along overlying and covering said foam core shorter upper base sides of said at least one cellular foam core structure abutting said primary covering layer at said foam core upper sides.

7. A foam core structure assembly as defined in claim 1 in which said foam cores of said at least one cellular foam core structure are isosceles trapezoids in transverse cross section with shorter upper base sides spaced away from said primary base layer, said foam cores of said at least one cellular foam core structure being transversely spaced apart with said primary covering layer abutting said primary base layer transversely between transverse extremities of said foam cores at said primary base layer and with one of said lines of stitching extending transversely adjacent each of said core transverse extremities at said primary base and covering layers; and in which said at least one cellular foam core structure of said assembly is a first cellular foam core structure and a second substantially identical cellular foam core structure is positioned inverted and downwardly interengaged with said cellular foam core structure, said foam cores of each of said cellular foam core structures in said assembly being transversely aligned with and alternately between said foam cores of the other of said cellular foam core structures and having said primary covering layers at said foam core short upper base sides abutting and resin bonded to said primary covering layers of the other of said cellular foam core structures transversely between said foam cores, said foam cores of said interengaged structures being constructed and arranged in said assembly with foam cores and said primary covering layers occupying substantially the entire space between the primary base layers of said interengaged structures with all abutting parts of said primary covering layers being resin bonded, said upper secondary covering layer of said assembly overlying and upwardly covering the primary base layer of said second cellular foam core structure.

8. A foam core structure assembly as defined in claim 1 in which certain of said foam cores of said at least one cellular foam core structure are isosceles trapezoids in transverse cross section and certain others of said foam cores are rectangular in transverse cross section, shorter upper base sides of said trapezoidal foam cores being spaced from said primary base layer; in which said foam cores of said at least one cellular foam core structure are transversely adjacent with transversely facing sides of adjacent of said foam cores of said structure having said primary covering layer abutting transversely between said adjacent cores; and in which said upper secondary covering layer of said assembly extends substantially continuously transversely and longitudinally along upper flat sides of said rectangular foam cores and said shorter upper base sides of said trapezoidal foam cores overlying and upwardly covering said at least one cellular foam core structure in said assembly.

References Cited

UNITED STATES PATENTS

| | | | |
|---|---|---|---|
| 2,454,719 | 11/1948 | Scogland | 161—139 UXR |
| 2,607,104 | 8/1952 | Foster | 161—133 UXR |
| 2,737,227 | 3/1956 | Brummel | 161—50 UXR |
| 3,117,902 | 1/1964 | Holzheimer | 161—36 XR |
| 3,188,813 | 6/1965 | Foster et al. | 161—135 UXR |
| 3,192,099 | 6/1965 | Beckman et al. | 161—43 |
| 3,282,769 | 11/1966 | Rodman et al. | 156—461 |
| 3,339,326 | 9/1967 | Derr et al. | 52—309 |

FOREIGN PATENTS 1,335,484  7/1963  France.

ROBERT F. BURNETT, Primary Examiner

W. A. POWELL, Assistant Examiner

U.S. Cl. X.R.

112—417; 156—93, 210, 300; 161—37, 39, 43, 44, 137, 159